United States Patent [19]

Sugiyama

[11] Patent Number: 5,978,533
[45] Date of Patent: Nov. 2, 1999

[54] OPTICAL PART FIXING CHIP

[75] Inventor: Mitsuhiro Sugiyama, Tokyo, Japan

[73] Assignee: NEC Corporation, Tokyo, Japan

[21] Appl. No.: 09/064,514

[22] Filed: Apr. 23, 1998

[30] Foreign Application Priority Data

Apr. 23, 1997 [JP] Japan ..................................... 9-106216

[51] Int. Cl.⁶ .................................................. G02B 6/30
[52] U.S. Cl. .................................. 385/49; 385/14; 385/42
[58] Field of Search .................................. 385/49, 14, 42, 385/40, 2, 8

[56] References Cited

U.S. PATENT DOCUMENTS 4,892,374 1/1990 Ackerman et al. ................... 385/49 X
5,559,914 9/1996 Asakura ..................................... 385/49

*Primary Examiner*—Phan T. H. Palmer
*Attorney, Agent, or Firm*—Sughrue, Mion, Zinn, Macpeak & Seas, PLLC

[57] ABSTRACT

An optical part fixing chip in accordance with the present invention comprises: a guide trench bored in a substrate and having one end thereof abutted on one side of the chip; and a stepped area abutting on one end of the guide trench and extending along one side of the optical part fixing chip. The height of the step of the stepped area is the same as the depth of the guide trench.

8 Claims, 6 Drawing Sheets

OPTICAL PART FIXING CHIP

BACKGROUND OF THE INVENTION

1. Field of the Invention

The present invention relates to an optical part fixing chip, or more particularly, to an optical part fixing chip having a guide trench for fixing an optical part such as an optical fiber.

2. Description of the Related Art

An optical part fixing chip used to fix an optical part, such as an optical fiber needed for optical communication or the like has a guide trench generally. An optical part such as an optical fiber, an optical semiconductor device, or the like is fitted in the guide trench and thus locked therein. The optical part fixing chip is formed in, for example, a silicon substrate. Like another semiconductor device, after an optical part fixing substrate having a plurality of optical part fixing chips set in array is fabricated, the optical part fixing chips are cut apart using, for example, diamond blading, laser scribing, or diamond point scribing.

An optical semiconductor device using an optical part fixing chip is, for example, a semiconductor waveguide photo-detector.

An example of an optical part fixing chip used for such a semiconductor waveguide photo-detector is, as shown in FIG. 1, such that an optical fiber fixing trench 13 is bored in a silicon substrate 10 in order to position and fix an end of an optical fiber 11. Moreover, another example is, as shown in FIG. 2, such that a photodiode 12 is formed in the silicon substrate 10, a metallic electrode 16 is formed above the photodiode 12, and an optical fiber fixing trench used to position an optical fiber 11 relative to the photodiode 12 and fix it therein is bored.

Moreover, an example of an optical part fixing chip other than the one used for the semiconductor waveguide photo-detector has, as shown in FIG. 3, a guide ditch 3 is used to fix an optical part such as an optical fiber therein. The guide trench 3a is used to fix an optical semiconductor device such as a semiconductor laser therein.

Taking the chip shown in FIG. 3 for instance, a process of fabricating an optical part fixing substrate and then producing individual optical part fixing chips will be described briefly in conjunction with FIG. 4.

First, an optical fiber fixing trench 13 is bored within each optical part fixing chip in a silicon substrate or the like by performing anisotropic etching or the like. In consideration of the width of the blade of a cutter used at a subsequent dicing step, the optical fiber fixing ditches 13 are etched in the silicon substrate in such a way that cut sections of the optical fiber fixing trench 13 emerge on one end sections of chips after dicing step and one ends of the optical fiber fixing trench straddle over scribed lines 4 that serve as cutting lines employed at the dicing step. Thereafter, a cutter or the like is used to carry out cutting along the scribed lines 4, whereby individual optical part fixing chips are cut apart. This results in the optical part fixing chips like the one shown in FIG. 1.

However, the foregoing optical part fixing chip of a prior art has problems described below.

That is to say, according to the prior art, after an optical part fixing substrate is fabricated, when the substrate is diced, the blade of a cutter traverses, as mentioned above, the optical fiber fixing ditches 13 and guide ditches 3. Depending on the way of cutting, the finishing of the cut sections of the optical fiber fixing ditches 13 and guide ditches 3 may become unsatisfactory. More particularly, as shown in FIG. 3, a defect or dent may occur in a sectional part 20 of a trench. When the defect or dent occurs, when an optical part such as an optical fiber is mounted at a subsequent step, an optical part fixing chip may break. This becomes a factor of markedly deteriorating a manufacturing yield.

SUMMARY OF THE INVENTION

The Objects of the Invention

Accordingly, an object of the present invention is to provide an optical part fixing chip in which a defect or dent will not occur in a sectional part of a trench during cutting.

Summary of the Invention

An optical part fixing chip in accordance with the present invention comprises a guide trench bored in a substrate and having one end thereof abutted on one side of the chip, and a stepped area abutting on one end of the guide trench and formed along one side of the optical part fixing chip. The height of the step of the stepped area is identical to the depth of the guide trench.

BRIEF DESCRIPTION OF THE DRAWINGS

The above-mentioned and other objects, features, advantages of this invention will become more apparent by reference to the following detailed description of the invention taken in conjunction with the accompanying drawings, wherein.

DETAILED DESCRIPTION OF THE PREFERRED EMBODIMENTS

Figure 1:
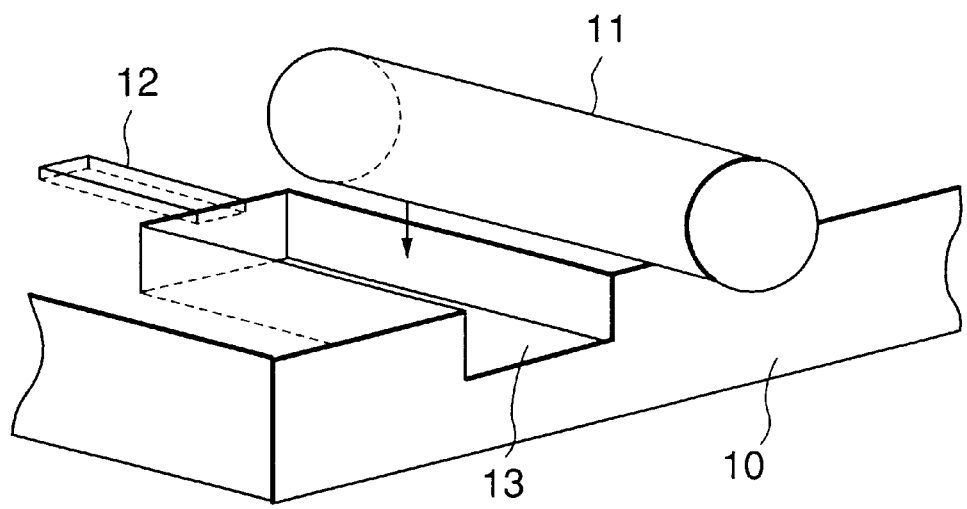
FIG. 1 is a diagram showing the structure of an optical part fixing chip in accordance with a prior art.
Figure 2:
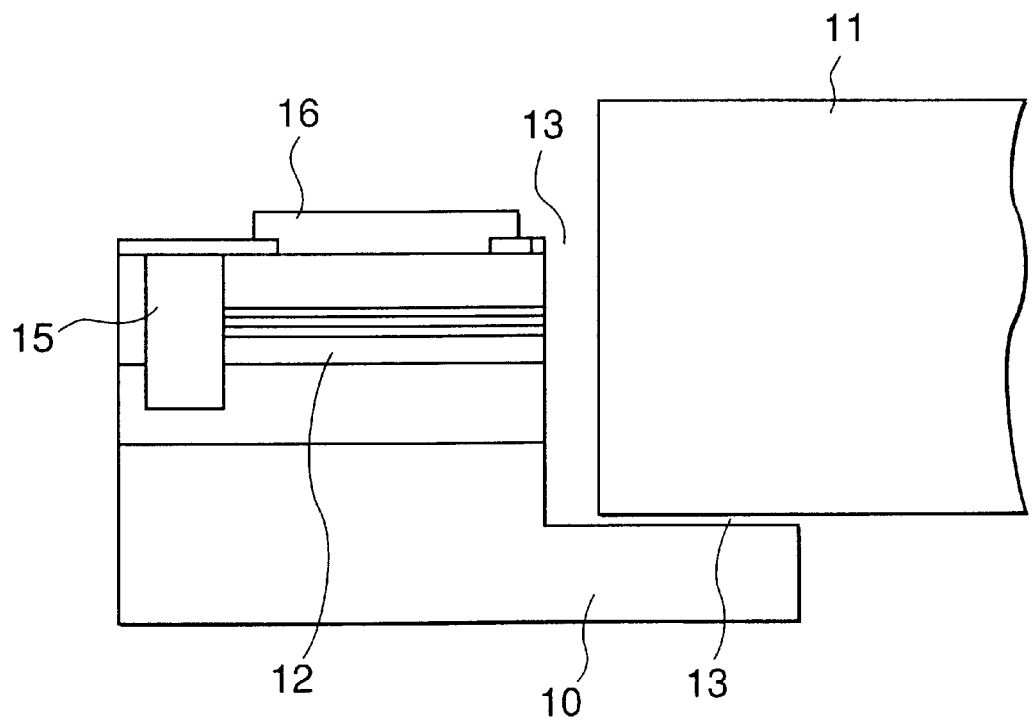
FIG. 2 is a diagram showing the structure of an optical part fixing chip in accordance with another prior art.
Figure 3:
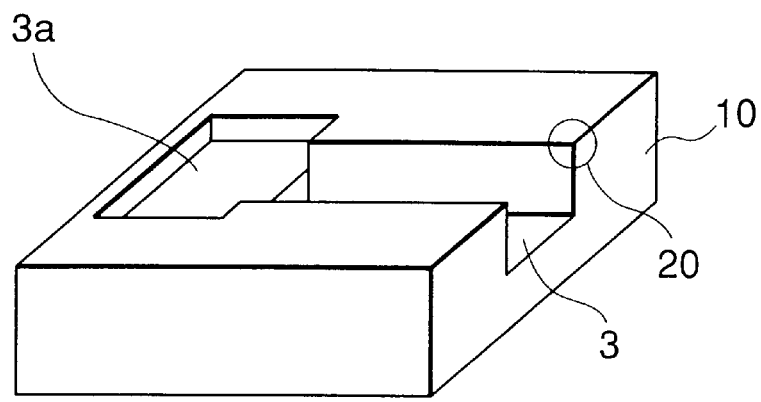
FIG. 3 is a diagram showing the structure of an optical part fixing chip in accordance with yet another prior art.
Figure 4:
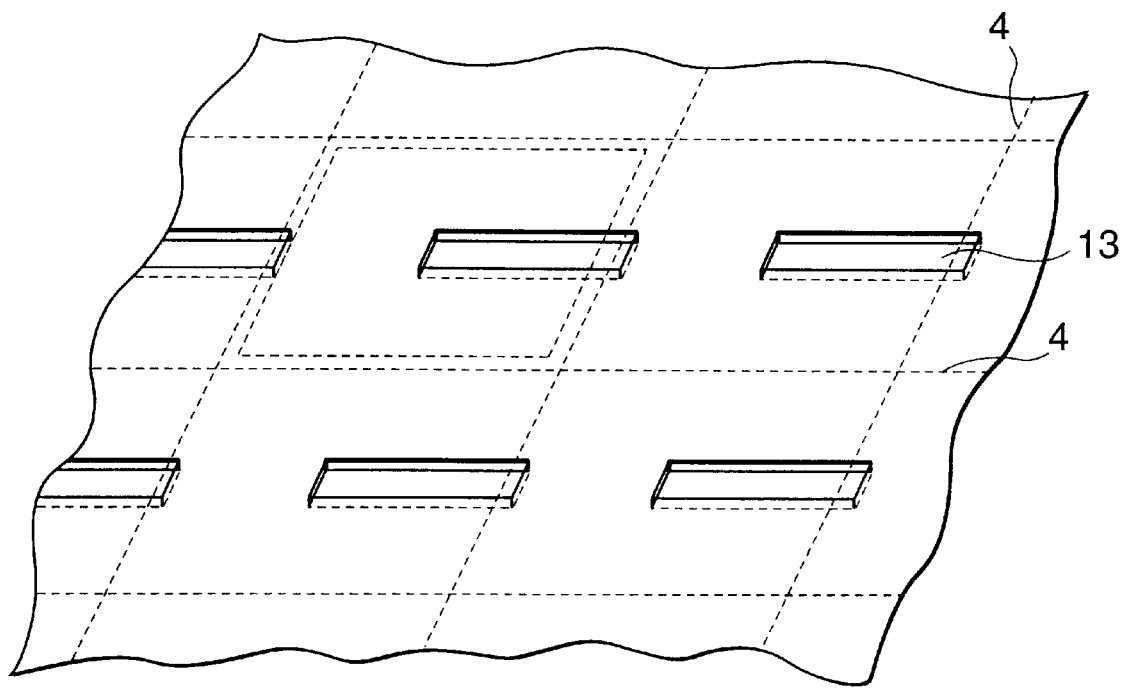
FIG. 4 is a diagram showing the structure of an optical part fixing substrate in accordance with a prior art.
Figure 5:
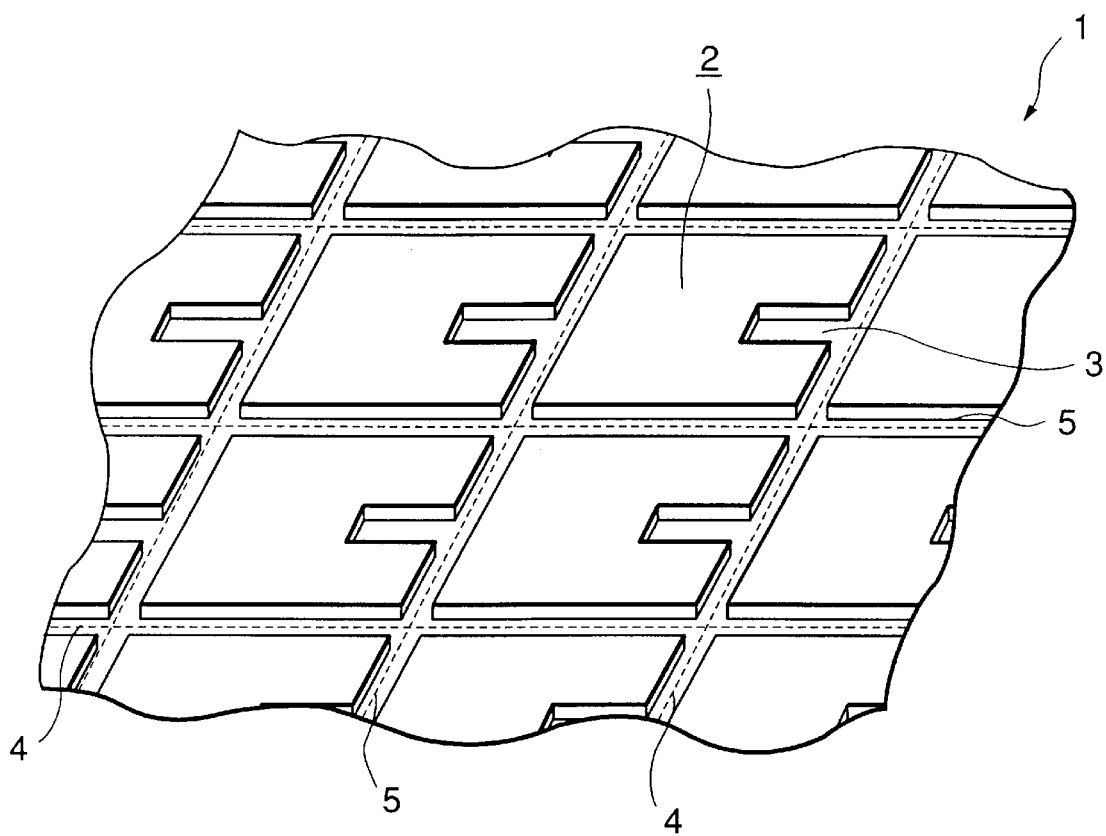
FIG. 5 is a diagram showing the structure of an optical part fixing substrate of the first embodiment of the present invention.

Referring the FIGS. 5 and 6, the first embodiment will be described. As shown in FIG. 5, an optical part fixing substrate 1 has a plurality of optical part fixing chips 2, which have not been cut apart, set in array. The optical part fixing chips 2 each have a guide trench 3 used to fix an optical part therein, and are separated by cutting the optical part fixing substrate 1 with the blade of a cutter aligned with scribed lines 4, and thus produced.

Now, this embodiment is characterized in that the optical part fixing substrate 1 has cutting ditches 5, of which depth is identical to that of the guide ditches 3, which are bored in such a way of straddling over the scribed lines 4.

In the optical part fixing substrate 1, after a resist pattern is formed according to, for example, the general photolithography, both the guide ditches 3 and cutting ditches 5 are bored simultaneously by carrying out dry etching using a gas such as SF6 or CL2. As for the size of the pattern, for example, when a single-mode optical fiber is locked in each guide trench 3, the depth of the guide ditches is in the order of approximately 75 micrometers and the width thereof is in the order of approximately 125 micrometers. Moreover, the depth of the cutting ditches 5 used for dicing is the same as the depth of the guide ditches 3, and the width of the cutting ditches 5 is in the order of 100 micrometers.

When the optical part fixing substrate 1 having the foregoing structure is diced in order to cut apart the respective optical part fixing chips 2, the blade of a cutter used for cutting is aligned with the scribed lines 4 in the cutting ditches 5. The width of the cutting ditches 5 is sufficiently larger than the width of the blade of the cutter. It will therefore not take place that the cutter traverses the guide trench 3 of each optical part fixing chip 2 or meets any guide trench 3.

Figure 6:
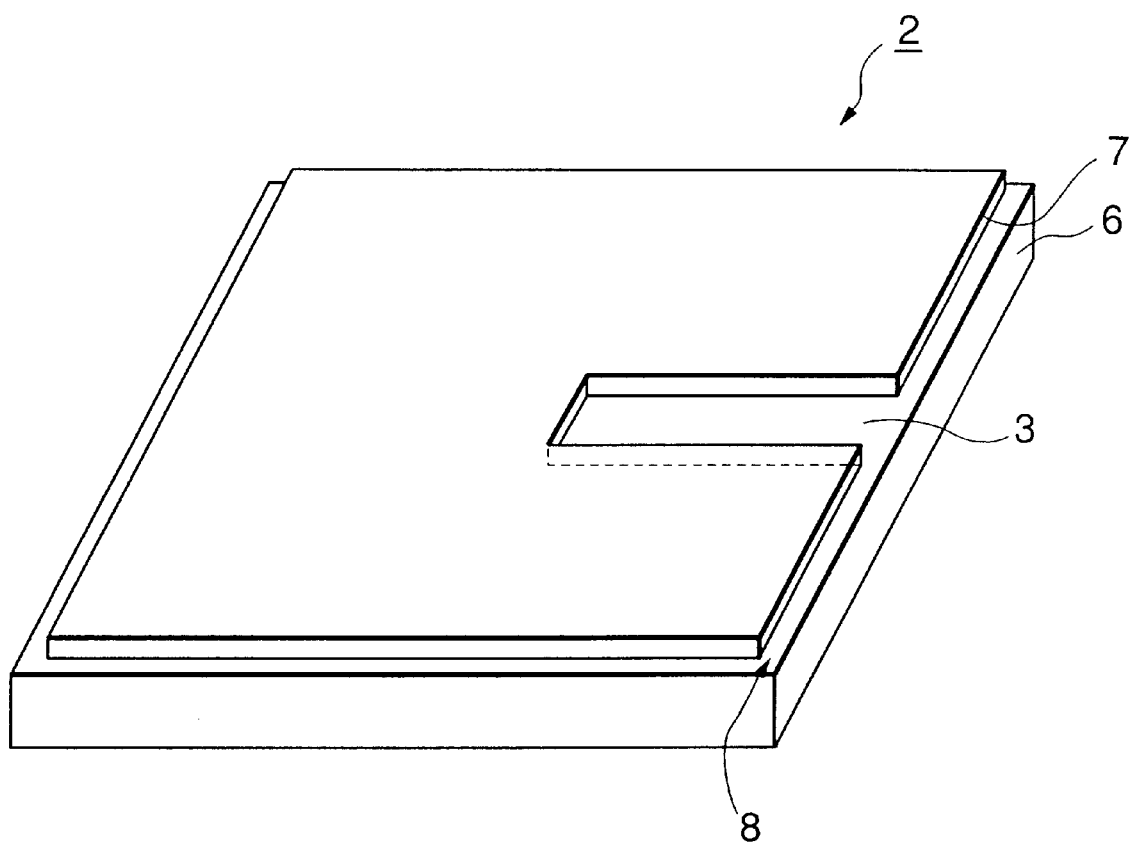
FIG. 6 is a diagram showing the structure of an optical part fixing chip of the first embodiment of the present invention.

The thus produced optical part fixing chips 2 have the structure shown in FIG. 6. Specifically, the optical part fixing chips 2 each have a chip end surface 6 resulting from dicing, and a trench end surface 7 used to serve as one side of a cutting trench 3. Since the end surface 7 is located inside the chip end surface 6, an L-shaped stepped area 8 is formed. In other words, the optical part fixing chips 2 each have the L-shaped stepped area 8, which provides a step, formed on the perimeter of an optical part fixing chip. The height of the bottoms of the stepped areas 8 is identical to that of the bottoms of the guide ditches 3. No step is therefore created on a joint plane fixing the bottom of each guide trench 3 and the bottom of each stepped area 8.

When the optical part fixing chips each having the foregoing structure are cut apart by dicing the optical part fixing substrate 1 using a cutter or the like, the cutter will not meet any guide trench 3. It will therefore not take place that the shape of any guide trench 3 appears abnormal after the optical part fixing chips 2 are cut apart. In other words, according to this embodiment, a drawback such as a defect and dent concerning the shape of the cut surface of a guide trench created by a cutter which has been a problem underlying the prior art will not occur.

In this embodiment, it should be noted that the optical part fixing chips 2 have been described in conjunction with the drawings showing each optical part fixing chip has one guide trench 3. Alternatively, each optical part fixing chip may have a plurality of guide ditches.

Moreover, the guide ditches 3 have been described by taking a rectangular trench for instance. Alternatively, for example, a so-called V-shaped trench will do.

Figure 7:
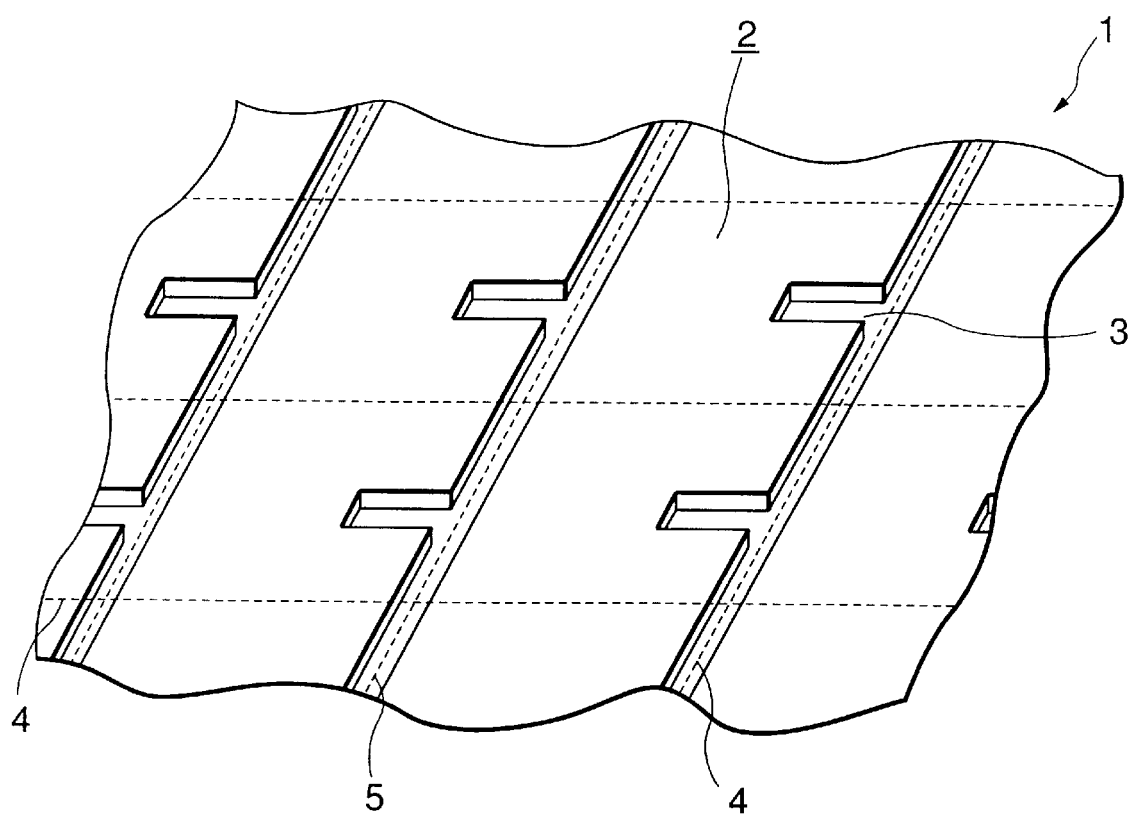
FIG. 7 is a diagram showing the structure of an optical part fixing substrate of the second embodiment of the present invention.

Next, the second embodiment of the present invention will be described with reference to FIGS. 7 and 8. A difference of this embodiment from the first embodiment lies in, as shown in FIG. 7, a point that the cutting ditches 5 are bored only in surface portions of the substrate abutting on the guide ditches 3. In other words the cutting ditches 5 are bored parallel to one another at intervals of a given distance, but no trench is present in directions orthogonal to the cutting ditches. The present invention solves the problem concerning the cut sections of the guide ditches 3. In principle, cutting ditches should be merely bored in the same directions as the surface portions of the substrate abutting on the guide ditches 3.

Figure 8:
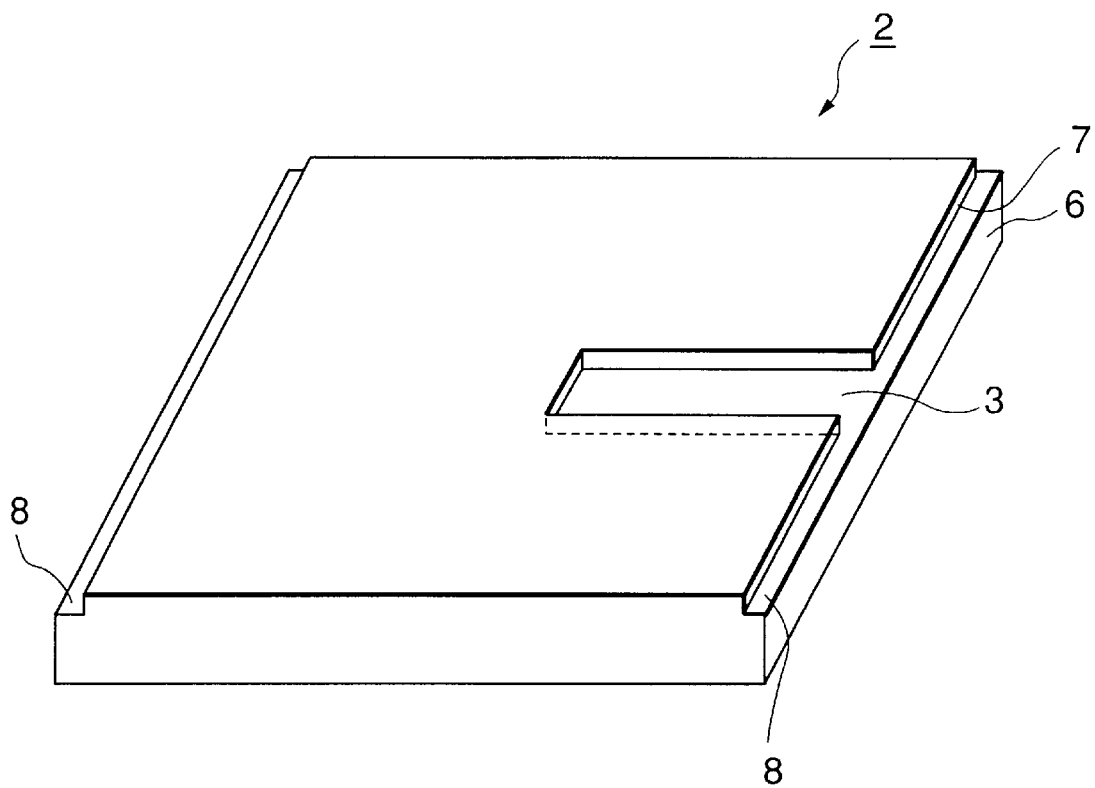
FIG. 8 is a diagram showing the structure of an optical part fixing chip of the second embodiment of the present invention.

When the optical part fixing substrate 1 shown in FIG. 7 is diced as shown in FIG. 8, the stepped area 8 exists only on the surface portion of the substrate abutting on the guide trench 3 of each optical part fixing chip 2 and on an opposite surface portion. Even this kind of structure can, like the one of the first embodiment, prevent the drawback such as the defect or dent occurring in the cut section of any guide trench.

Although the invention has been described with reference to specific embodiment, this description is not met to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. An optical part fixing chip for fixing an optical part, comprising:

a guide trench bored in a substrate and having one end thereof abutted on one side of said chip; and a stepped area abutting on one end of said guide trench and formed along one side of said optical part fixing chip, wherein the height of the step of said stepped area is identical to the depth of said guide trench.

2. An optical part fixing chip according to claim 1, wherein said stepped area is formed around the perimeter of said optical part fixing chip.

3. An optical part fixing chip according to claim 1, wherein said stepped area has an L-shaped portion, a bottom of which is joined with a the bottom of said guide trench on the same plane.

4. An optical part fixing substrate having a plurality of optical part fixing chips set in array, comprising:

guide ditches bored within said plurality of optical part fixing chips;

scribed lines formed along the borders of said plurality of optical part fixing chips; and cutting ditches abutting on one of the ends of said guide ditches and extending over said scribed lines, wherein the depth of said guide ditches is identical to that of said cutting ditches.

5. An optical part fixing substrate according to claim 4, wherein said cutting ditches are bored in straddling over all of said scribed lines.

6. An optical part fixing chip for fixing an optical part, comprising:

a stepped area formed along at least a portion of the perimeter of said chip and providing a step that has a given depth from the surface of said chip; and a guide trench bored in the surface of said chip, having one end thereof abutted on said stepped are, and having the same depth as said stepped area.

7. An optical part fixing chip according to claim 6, wherein said stepped area is formed around the entire perimeter of said chip.

8. An optical part fixing chip according to claim 6, wherein said stepped area is formed along the portion of the chip perimeter which interfaces the guide trench.

* * * * *